US009859975B2

(12) United States Patent
Zeng et al.

(10) Patent No.: US 9,859,975 B2
(45) Date of Patent: Jan. 2, 2018

(54) APPARATUS AND METHOD FOR DETECTING UPLINK OPTICAL SIGNAL (71) Applicant: Huawei Technologies Co., Ltd., Shenzhen (CN)

(72) Inventors: Xiaofei Zeng, Shenzhen (CN); Sanzhong Li, Shenzhen (CN); Gang Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/176,845

(22) Filed: Jun. 8, 2016

(65) Prior Publication Data

US 2016/0285546 A1    Sep. 29, 2016

Related U.S. Application Data (63) Continuation of application No. PCT/CN2013/088894, filed on Dec. 9, 2013.

(51) Int. Cl.
*H04B 10/07*    (2013.01)
*H04B 10/079*   (2013.01)
*H04B 10/27*    (2013.01)

(52) U.S. Cl.
CPC ......... *H04B 10/0793* (2013.01); *H04B 10/07* (2013.01); *H04B 10/0795* (2013.01); *H04B 10/27* (2013.01)

(58) Field of Classification Search
CPC ............... H04B 10/0793; H04B 10/07; H04B 10/0795; H04B 10/27

(Continued)

(56) References Cited

U.S. PATENT DOCUMENTS

2003/0179769 A1*  9/2003  Shi ............... H04J 3/1694
                                              370/442
2008/0089685 A1*  4/2008  Kazawa ........... H04J 3/0682
                                              398/66

(Continued)

FOREIGN PATENT DOCUMENTS

CN    101005317 A    7/2007
CN    101039159 A    9/2007

(Continued)

OTHER PUBLICATIONS

Partial English Translation and Abstract of Chinese Patent Application No. CN102075244, May 27, 2016, 2 pages.

(Continued)

*Primary Examiner* — Dalzid Singh
(74) *Attorney, Agent, or Firm* — Conley Rose, P.C.

(57) ABSTRACT

An apparatus and a method for detecting an uplink optical signal. The apparatus includes a memory and a processor, where the processor is configured to determine a remaining bandwidth in a target uplink frame as a test window, where the remaining bandwidth in the target uplink frame indicates an unallocated bandwidth in the target uplink frame, and detect an uplink optical signal in the determined test window. Therefore, a remaining bandwidth obtained after bandwidth allocation in a target uplink frame is used to detect an uplink optical signal, which can effectively use a resource without the need of independently opening a test window and using an extra resource to detect the uplink optical signal, thereby avoiding waste of a resource and improving test efficiency.

15 Claims, 4 Drawing Sheets (58) Field of Classification Search
USPC .......................................................... 398/25
See application file for complete search history.

(56) References Cited

U.S. PATENT DOCUMENTS

| | | | |
|---|---|---|---|
| 2010/0067901 A1* | 3/2010 | Mizutani | H04B 10/03 398/20 |
| 2010/0272436 A1* | 10/2010 | Mizutani | H04B 10/272 398/25 |
| 2011/0243554 A1* | 10/2011 | Niibe | H04B 10/0793 398/38 |
| 2012/0163808 A1 | 6/2012 | Kim et al. | |
| 2013/0004156 A1 | 1/2013 | Yang et al. | |
| 2013/0177313 A1* | 7/2013 | Hirth | H04Q 11/0067 398/66 |

FOREIGN PATENT DOCUMENTS

| | | |
|---|---|---|
| CN | 102075244 A | 5/2011 |
| CN | 102388549 A | 3/2012 |
| CN | 102546010 A | 7/2012 |
| CN | 102917285 A | 2/2013 |

OTHER PUBLICATIONS

Foreign Communication From A Counterpart Application, Chinese Application No. 2013800030782, Chinese Search Report dated Jul. 14, 2016, 2 pages.
Foreign Communication From A Counterpart Application, Chinese Application No. 201380003078.2, Chinese Office Action dated Jul. 25, 2016, 7 pages.
Foreign Communication From A Counterpart Application, European Application No. 13899157.5, Extended European Search Report dated Oct. 24, 2016, 8 pages.
Foreign Communication From A Counterpart Application, PCT Application No. PCT/CN2013/088894, English Translation of International Search Report dated Apr. 30, 2014, 2 pages.
Foreign Communication From A Counterpart Application, PCT Application No. PCT/CN2013/088894, English Translation of Written Opinion dated Apr. 30, 2014, 11 pages.

* cited by examiner

APPARATUS AND METHOD FOR DETECTING UPLINK OPTICAL SIGNAL

CROSS-REFERENCE TO RELATED APPLICATIONS

This application is a continuation of International Application No. PCT/CN2013/088894, filed on Dec. 9, 2013, which is hereby incorporated by reference in its entirety.

TECHNICAL FIELD

Embodiments of the present disclosure relate to the field of communications technologies, and in particular, to an apparatus and a method for detecting an uplink optical signal.

BACKGROUND

In an optical network apparatus such as a gigabit-capable passive optical network (GPON) apparatus, one optical line terminal (OLT) central office device may be connected to one or more optical network devices applied to a user end, such as an optical network terminal (ONT) or an optical network unit (ONU). In a downstream direction, an OLT sends downlink information to all ONTs (or ONUs) connected to the OLT at a fixed downlink optical wavelength, and in an upstream direction, an ONT sends an uplink optical signal to the OLT in a specific timeslot according to a dynamic bandwidth allocation (DBA) scheduling mechanism of the OLT.

When an abnormality occurs in an optical network, for example, light emitting devices with a same wavelength are connected to an optical network line, or an ONT is faulty, causing abnormal light emitting, such an abnormality is referred to as a "rogue ONT" in the industry. Abnormal uplink light may occupy a light emitting timeslot of the ONT, thereby affecting normal communication between the ONT and the OLT, causing a bit error, and even making the ONT go offline. To avoid occurrence of a "rogue ONT", an existing mechanism is that using media access control (MAC), an empty window with a bandwidth not less than that of an uplink frame is independently opened as a test window to detect an uplink optical signal, to locate the abnormality in the optical network. Therefore, not only a resource is wasted, but also test efficiency is low.

SUMMARY

Embodiments of the present disclosure provide an apparatus and a method for detecting an uplink optical signal, which can effectively use a resource and improve test efficiency.

According to a first aspect, an apparatus for detecting an uplink optical signal is provided, where the apparatus includes a control module and a test module, where the control module is configured to determine a remaining bandwidth in a target uplink frame as a test window, where the remaining bandwidth in the target uplink frame indicates an unallocated bandwidth in the target uplink frame, and the test module is configured to detect an uplink optical signal in the test window determined by the control module.

With reference to the first aspect, in a possible implementation manner, the control module is further configured to determine the remaining bandwidth in the target uplink frame as the test window when the remaining bandwidth in the target uplink frame is greater than or equal to a first threshold.

With reference to the first aspect or the foregoing implementation manner, in another possible implementation manner of the first aspect, the control module is further configured to trigger a DBA module to open an empty window with a bandwidth greater than or equal to the first threshold, as the test window, in a case in which remaining bandwidths in N successive target uplink frames are all less than the first threshold, where N is a positive integer.

With reference to the first aspect and either of the foregoing implementation manners, in another implementation manner of the first aspect, an allocated bandwidth in the target uplink frame is used by an optical network device to transmit the uplink optical signal.

With reference to the first aspect and any of the foregoing implementation manners, in another implementation manner of the first aspect, the apparatus further includes a data module and an optical module, where the optical module is configured to receive the uplink optical signal sent by the optical network device, perform optical-to-electrical conversion on the uplink optical signal to obtain an uplink electrical signal, and send the uplink electrical signal to the data module. The data module is configured to receive the uplink electrical signal sent by the optical module, and the test module is further configured to detect, in the test window determined by the control module, a code stream of the uplink electrical signal received by the data module.

With reference to the first aspect and any of the foregoing implementation manners, in another implementation manner of the first aspect, the apparatus further includes an optical module, where the optical module is configured to receive the uplink optical signal sent by the optical network device, and the test module is further configured to detect, in the test window determined by the control module, whether the optical module receives the uplink optical signal, and/or detect, in the test window determined by the control module, strength of the uplink optical signal received by the optical module.

According to a second aspect, an OLT is provided, where the OLT includes the foregoing the apparatuses for detecting an uplink optical signal.

According to a third aspect, a system for detecting an uplink optical signal is provided, where the system includes an OLT, a passive optical splitter, and at least one ONU, and the OLT includes any one of the apparatuses for detecting an uplink optical signal.

According to a fourth aspect, a method for detecting an uplink optical signal is provided, where the method includes determining a remaining bandwidth in a target uplink frame as a test window, where the remaining bandwidth in the target uplink frame indicates an unallocated bandwidth in the target uplink frame, and detecting the uplink optical signal in the determined test window.

With reference to the fourth aspect, in a possible implementation manner, determining a remaining bandwidth in a target uplink frame as a test window includes determining the remaining bandwidth in the target uplink frame as the test window in a case in which the remaining bandwidth in the target uplink frame is greater than or equal to a first threshold.

With reference to the fourth aspect and any implementation manner of the foregoing implementation manner, in another implementation manner of the fourth aspect, the method further includes opening an empty window with a bandwidth greater than or equal to the first threshold, as the test window when remaining bandwidths in N successive target uplink frames are all less than the first threshold, where N is a positive integer.

With reference to the fourth aspect and either of the foregoing implementation manners, in another implementation manner of the fourth aspect, an allocated bandwidth in the target uplink frame is used by an optical network device to transmit the uplink optical signal.

With reference to the fourth aspect and any of the foregoing implementation manners, in another implementation manner of the fourth aspect, detecting an uplink optical signal in the test window includes detecting, in the test window, a code stream of an uplink electrical signal sent by an optical module and received by a data module, where the uplink electrical signal is obtained by the optical module by performing optical-to-electrical conversion on the uplink optical signal.

With reference to the fourth aspect and any of the foregoing implementation manners, in another implementation manner of the fourth aspect, detecting an uplink optical signal in the test window includes detecting, in the test window, whether the optical module receives the uplink optical signal sent by the optical network device, and/or detecting, in the test window, strength of the uplink optical signal that is received by the optical module from the optical network device.

According to the embodiments of the present disclosure, a control module determines an unallocated bandwidth in a target uplink frame as a test window, and a test module detects an uplink optical signal in the test window determined by the control module. Therefore, a remaining bandwidth obtained after bandwidth allocation in a target uplink frame is used to detect an uplink optical signal, which can effectively use a resource without the need of independently opening a test window and using an extra resource to detect the uplink optical signal, thereby avoiding waste of a resource and improving test efficiency.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
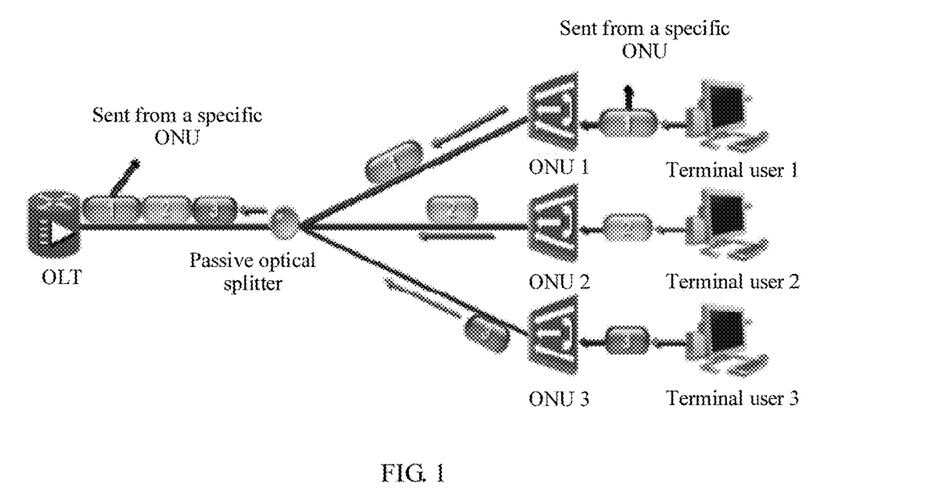
FIG. 1 is a schematic diagram of a scenario of an optical network system in which an embodiment of the present disclosure can be implemented.

FIG. 1 is a schematic diagram of a scenario of an optical network system in which an embodiment of the present disclosure can be implemented. One OLT is shown in the diagram of the scenario in FIG. 1, and using a passive optical splitter, the OLT is connected to three ONUs, which are ONU 1, ONU 2, and ONU 3. In a downstream direction, the OLT sends downlink information to all the ONUs connected to the OLT at a fixed downlink optical wavelength. Correspondingly, in an upstream direction, each ONU sends an uplink optical signal to the OLT in a specific timeslot, for example, a terminal user 1 sends an uplink optical signal to the OLT in a timeslot 1 using the ONU 1, a terminal user 2 sends an uplink optical signal to the OLT in a timeslot 2 using the ONU 2, and a terminal user 3 sends an uplink optical signal to the OLT in a timeslot 3 using the ONU 3. It should be understood that, the diagram of the scenario in FIG. 1 is only for convenience of description, and is not limited in this embodiment of the present disclosure. The number of the devices in FIG. 1 may be one or more, for example, one OLT may be connected to one or more optical network devices applied to a user end, and the optical network device may be an ONU, an ONT, or the like.

When an abnormality occurs in an optical network, for example, an ONU is faulty, causing abnormal light emitting, light emitting timeslots of other ONUs may be occupied, thereby affecting normal communication between the ONU and the OLT, causing a bit error, and even offline. In the prior art, an empty window with a bandwidth not less than a bandwidth of an uplink frame is independently opened as a test window to detect an uplink optical signal, to locate the abnormality in the optical network. Therefore, not only a resource is wasted, but also test efficiency is low.

To resolve the foregoing problem, the embodiments of the present disclosure provide an apparatus and a method for detecting an uplink optical signal, which can effectively use a resource and improve test efficiency.

Figure 2:
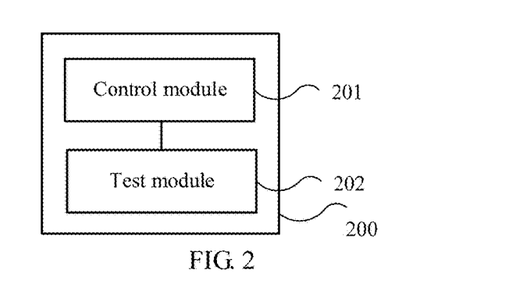
FIG. 2 is a structural block diagram of an apparatus for detecting an uplink optical signal according to an embodiment of the present disclosure.

FIG. 2 is a structural block diagram of an apparatus for detecting an uplink optical signal according to an embodiment of the present disclosure. The apparatus 200 for detecting an uplink optical signal in FIG. 2 includes a control module 201 and a test module 202.

The control module 201 is configured to determine a remaining bandwidth in a target uplink frame as a test window, where the remaining bandwidth in the target uplink frame indicates an unallocated bandwidth in the target uplink frame.

The test module 202 is configured to detect an uplink optical signal in the test window determined by the control module 201.

The detected uplink signal may be an uplink optical signal, or may be an uplink electrical signal obtained after optical-to-electrical conversion is performed on the uplink optical signal, which is not limited in this embodiment of the present disclosure. Detection may be performed on, including but not limited to, whether there is an uplink signal, power or strength of the uplink signal, a code stream of the uplink electrical signal, and the like.

According to this embodiment of the present disclosure, a control module determines an unallocated bandwidth in a target uplink frame as a test window, and a test module detects an uplink optical signal in the test window determined by the control module. Therefore, a remaining bandwidth obtained after bandwidth allocation in a target uplink frame is used to detect an uplink optical signal, which can effectively use a resource without the need of independently opening a test window and using an extra resource to detect the uplink optical signal, thereby avoiding waste of a resource and improving test efficiency.

Figure 3:
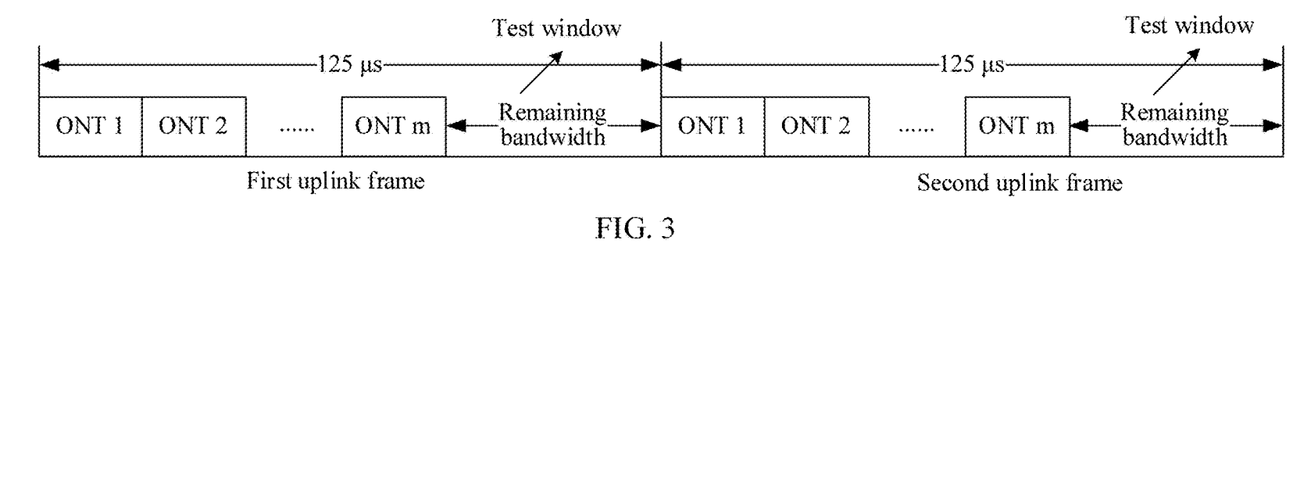
FIG. 3 is a schematic diagram of bandwidth allocation of an uplink frame according to an embodiment of the present disclosure.

Optionally, an allocated bandwidth in the target uplink frame may be used by an optical network device to transmit an uplink optical signal. Exemplarily, as shown in FIG. 3, a bandwidth of each uplink frame is 125 microsecond (µs), and some bandwidths are allocated to m (m is a positive integer) optical network devices, which are ONT 1, ONT 2, . . . , ONT m. A remaining bandwidth in the uplink frame except the allocated bandwidth can be used to detect an uplink optical signal.

In another embodiment of the present disclosure, a function of the apparatus 200 for detecting an uplink optical signal may be further extended.

Exemplarily, the control module 201 may be further configured to determine the remaining bandwidth in the target uplink frame as the test window in a case in which the remaining bandwidth in the target uplink frame is greater than or equal to a first threshold. For example, the first threshold may be set to 1/M of a total bandwidth of the uplink frame, where M is an integer greater than or equal to 1. It is assumed that the total bandwidth of the uplink frame is 125 µs, the first threshold may be set to 1/125 or 1/250 of the total bandwidth of the uplink frame, that is, 1 µs or 0.5 µs. In this way, related detection can be completed using a remaining bandwidth in a same target uplink frame, which ensures reliability of a detection result. It should be understood that, a value of the first threshold is not limited in this embodiment of the present disclosure.

Exemplarily, the control module 201 may be further configured to trigger a DBA module to open an empty window with a bandwidth greater than or equal to the first threshold, as the test window in a case in which remaining bandwidths in N successive target uplink frames are all less than the first threshold, where N is a positive integer, and trigger the test module 202 to detect, in the empty window, an uplink optical signal. Optionally, the bandwidth of the empty window may be set to be greater than or equal to the first threshold.

That is, preferably, when a remaining bandwidth in an uplink frame is sufficient, the test module 202 can start detection in the remaining bandwidth in the uplink frame, and when neither/none of remaining bandwidths in N successive uplink frames is greater than the preset first threshold, that is, neither/none of the N successive frames has a sufficient remaining bandwidth, an empty window can be started for detection.

Figure 4:
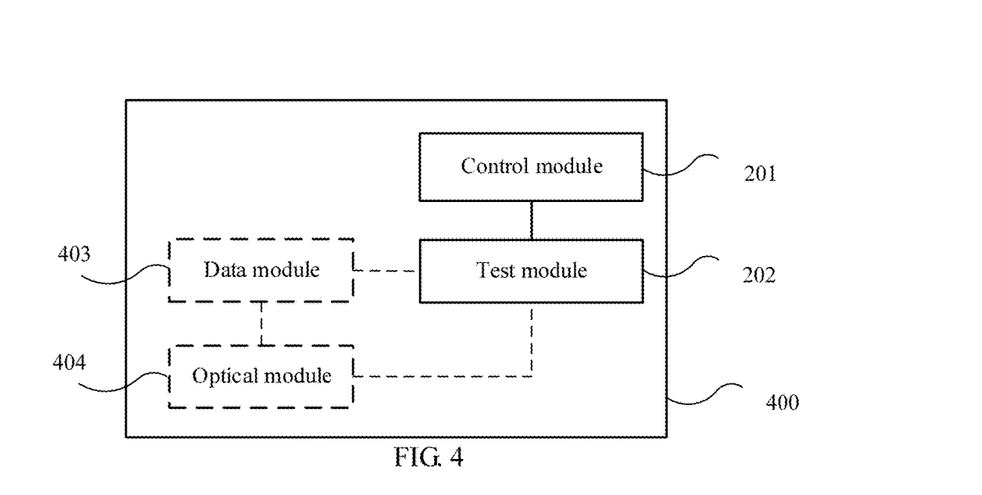
FIG. 4 is a structural block diagram of an apparatus for detecting an uplink optical signal according to another embodiment of the present disclosure.

Exemplarily, as shown in FIG. 4, the apparatus 400 may further include a data module 403 and an optical module 404. The optical module 404 is configured to receive the uplink optical signal sent by the optical network device, perform optical-to-electrical conversion on the uplink optical signal to obtain an uplink electrical signal, and send the uplink electrical signal to the data module 403. The data module 403 is configured to receive the uplink electrical signal sent by the optical module 404, and the test module 202 may be further configured to detect, in the test window determined by the control module 201, a code stream of the uplink electrical signal received by the data module 403, and/or, the apparatus 200 may further include an optical module 404, where the optical module 404 is configured to receive the uplink optical signal sent by the optical network device, and the test module 202 may be further configured to detect, in the test window determined by the control module 201, whether the optical module 404 receives the uplink optical signal, and/or detect, in the test window determined by the control module 201, strength of the uplink optical signal received by the optical module 404, and the like. It should be understood that, these examples are merely exemplary, and are not intended to limit the scope of the present disclosure, and a manner of detecting an uplink optical signal is not limited in this embodiment of the present disclosure.

Figure 5:
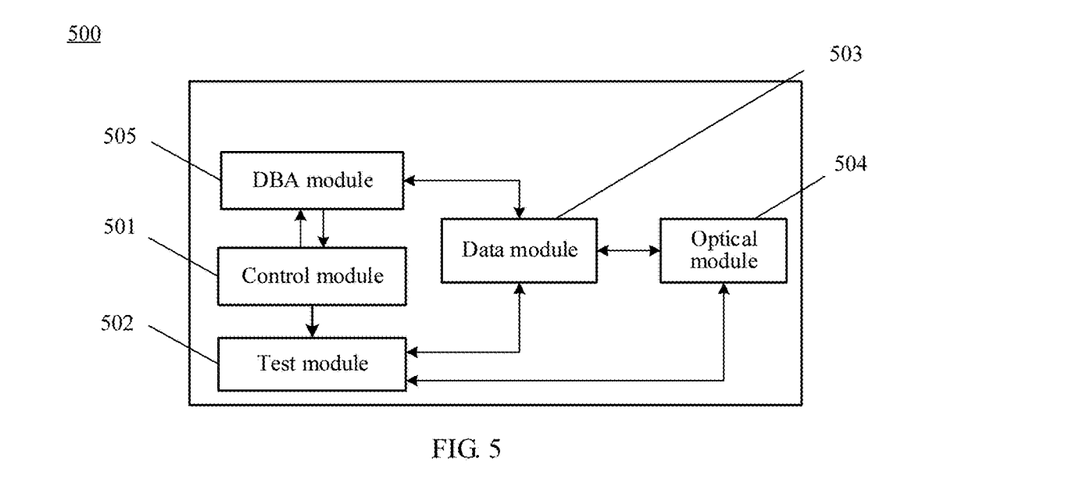
FIG. 5 is a structural block diagram of an apparatus for detecting an uplink optical signal according to still another embodiment of the present disclosure.

The following describes this embodiment of the present disclosure in detail with reference to an example in FIG. 5.

An apparatus 500 for detecting an uplink optical signal in FIG. 5 includes a control module 501 and a test module 502. Optionally, the apparatus 500 may further include a data module 503, an optical module 504, and a DBA module 505. The optical module 504 receives an uplink optical signal sent by an optical network device (such as an ONT or an ONU), and implements optical-to-electrical conversion, and the data module 503 receives an uplink electrical signal that is obtained after the optical-to-electrical conversion is performed on the uplink optical signal and that is sent by the optical module 504. The foregoing first threshold, N, the number of times that an empty window is started to detect successive frames that have an insufficient remaining bandwidth each, a detection parameter (such as strength of an optical signal, or a code stream of the optical signal), or the like may be preset in the control module 501. Furthermore, the DBA module 505 is configured to allocate, in an uplink frame for the optical network device (such as an ONT or an ONU), a bandwidth used for transmitting an uplink optical signal, and report, to the control module 501, a remaining bandwidth obtained after the bandwidth allocation. The control module 501 is configured to determine whether the remaining bandwidth reported by the DBA module 505 is sufficient (whether the remaining bandwidth reported by the DBA module 505 is greater than or equal to the preset first threshold), and when the remaining bandwidth is sufficient, determine the remaining bandwidth as a test window, and trigger the test module 502 to detect an uplink optical signal in the remaining bandwidth. When detecting, for N successive N times, that a remaining bandwidth reported by the DBA module 505 is sufficient, the control module 501 triggers the DBA module 505 to independently open an empty window, determine the empty window as a test window, and trigger the test module 502 to detect, in the empty window, an uplink optical signal. Optionally, the test module 502 detects an uplink optical signal in the test window according to the detection parameter, which includes but is not limited to, detecting a code stream of the uplink electrical signal received by the data module 503, detecting whether the optical module 504 receives the uplink optical signal, or detecting strength of the uplink optical signal received by the optical module 504.

According to this embodiment of the present disclosure, a control module determines an unallocated bandwidth in a target uplink frame as a test window, and a test module detects an uplink optical signal in the test window determined by the control module. Therefore, a remaining bandwidth obtained after bandwidth allocation in a target uplink frame is used to detect an uplink optical signal, which can effectively use a resource without the need of independently opening a test window and using an extra resource to detect the uplink optical signal, thereby avoiding waste of a resource and improving test efficiency. In addition, an abnormality that occurs in an optical network can be identified in time by detecting an uplink optical signal such that a corresponding measure is taken to rectify a fault, thereby reducing a fault duration of an optical network system and improving customer satisfaction.

It should be noted that, the foregoing apparatus for detecting an uplink optical signal may be an independent entity, or may be disposed in another optical network device, for example, the apparatus may be disposed in an OLT.

Figure 6:
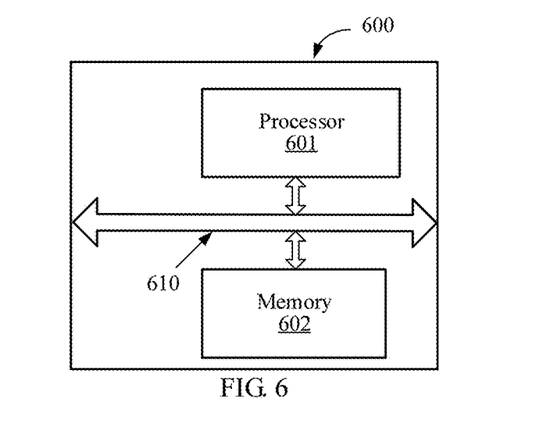
FIG. 6 is a structural block diagram of an apparatus for detecting an uplink optical signal according to yet another embodiment of the present disclosure.

FIG. 6 is a structural block diagram of an apparatus for detecting an uplink optical signal according to another embodiment of the present disclosure. In this embodiment, the apparatus 600 includes a processor 601 and a memory 602. The processor 601 controls an operation of the apparatus 600 for detecting an uplink optical signal, and the processor 601 may also be referred to as a central processing unit (CPU). The memory 602 may include a read-only memory and a random access memory, and provides an instruction and data for the processor 601. A part of the memory 602 may further include a non-volatile random access memory (NVRAM). The processor 601 and the memory 602 are coupled using a bus system 610, and in addition to a data bus, the bus system 610 further includes a power bus, a control bus, and a status signal bus. However, for clear description, various types of buses in the figure are all marked as the bus system 610.

The method disclosed in the foregoing embodiment of the present disclosure may be applied to the device 600 of the foregoing storage system. The processor 601 may be an integrated circuit chip, and has a signal processing capability. During an implementation process, the steps of the foregoing method can be completed using an integrated logical circuit of hardware in the processor 601 or an instruction in a software form of the processor 601.

In this embodiment of the present disclosure, a memory chip performs the following operations according to an operation instruction (the operation instruction may be stored in an operating system) stored by the memory 602 and invoked by the processor 601: determining a remaining bandwidth in a target uplink frame as a test window, where the remaining bandwidth in the target uplink frame indicates an unallocated bandwidth in the target uplink frame, and detecting an uplink optical signal in the determined test window.

Optionally, an allocated bandwidth in the target uplink frame may be used by an optical network device to transmit an uplink optical signal. For a specific example, refer to the foregoing embodiment in FIG. 3, which is not described herein again.

In another embodiment of the present disclosure, a function of the apparatus 600 for detecting an uplink optical signal may be further extended.

Exemplarily, the processor 601 may be further configured to determine the remaining bandwidth in the target uplink frame as the test window in a case in which the remaining bandwidth in the target uplink frame is greater than or equal to a first threshold. In this way, related detection can be completed using a remaining bandwidth in a same target uplink frame, which ensures reliability of a detection result. For a specific example, refer to the foregoing description, which is not described herein again. It should be understood that, a value of the first threshold is not limited in this embodiment of the present disclosure.

Exemplarily, the processor 601 may be further configured to open an empty window with a bandwidth greater than or equal to the first threshold, as the test window, where N is a positive integer in a case in which remaining bandwidths in N successive target uplink frames are all less than the first threshold, and detect an uplink optical signal in the empty window. Optionally, the bandwidth of the empty window may be set to be greater than or equal to the first threshold.

That is, preferably, when a remaining bandwidth in an uplink frame is sufficient, detection can be started in the remaining bandwidth in the uplink frame, and when neither/none of remaining bandwidths in N successive uplink frames is greater than the preset first threshold, that is, neither/none of the N successive frames has a sufficient remaining bandwidth, an empty window can be started for detection.

Exemplarily, the processor 601 may be further configured to detect, in the test window, a code stream of a received uplink electrical signal, and/or detect, in the test window, whether an uplink optical signal is received, and/or detect strength of a received uplink optical signal, and the like. It should be understood that, these examples are merely exemplary, and are not intended to limit the scope of the present disclosure, and a manner of detecting an uplink optical signal is not limited in this embodiment of the present disclosure.

According to this embodiment of the present disclosure, an apparatus for detecting an uplink optical signal determines an unallocated bandwidth in a target uplink frame as a test window, and detects the uplink optical signal in the test window. Therefore, a remaining bandwidth obtained after bandwidth allocation in a target uplink frame is used to detect an uplink optical signal, which can effectively use a resource without the need of independently opening a test window and using an extra resource to detect the uplink optical signal, thereby avoiding waste of a resource and improving test efficiency.

It should be noted that, any one of the apparatuses for detecting an uplink optical signal in the foregoing FIG. 2 to FIG. 6 may be an independent entity, or may be disposed in another optical network device, for example, the apparatus may be disposed in an OLT.

Figure 7:
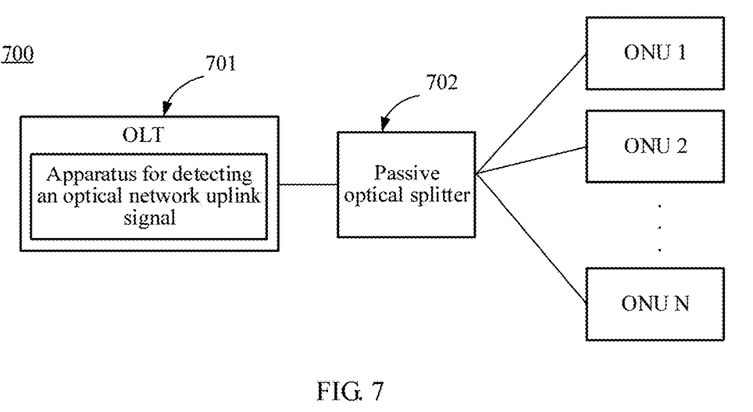
FIG. 7 is a schematic block diagram of an apparatus for detecting an uplink optical signal according to an embodiment of the present disclosure.

FIG. 7 is a schematic block diagram of a system for detecting an uplink optical signal according to an embodiment of the present disclosure. The system 700 includes an OLT 701, a passive optical splitter 702, and at least one ONU (or ONT), and N ONUs shown in FIG. 7 are ONU 1, ONU 2, . . . , ONU N, where N is a positive integer, and the OLT 701 includes any one of the apparatuses for detecting an uplink optical signal in the foregoing FIG. 2 to FIG. 6.

Figure 8:
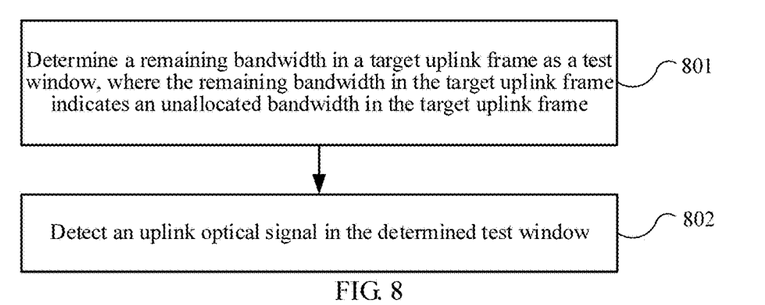
FIG. 8 is a flowchart of a method for detecting an uplink optical signal according to an embodiment of the present disclosure.

FIG. 8 is a flowchart of a method for detecting an uplink optical signal according to an embodiment of the present disclosure. The method includes the following steps.

Step 801: Determine a remaining bandwidth in a target uplink frame as a test window, where the remaining bandwidth in the target uplink frame indicates an unallocated bandwidth in the target uplink frame.

Step 802: Detect an uplink optical signal in the determined test window.

According to this embodiment of the present disclosure, an unallocated bandwidth in a target uplink frame is determined as a test window, and an uplink optical signal is detected in the test window. Therefore, a remaining bandwidth obtained after bandwidth allocation in a target uplink frame is used to detect an uplink optical signal, which can effectively use a resource without the need of independently opening a test window and using an extra resource to detect the uplink optical signal, thereby avoiding waste of a resource and improving test efficiency.

The method in FIG. 8 can be implemented by the apparatuses for detecting an uplink optical signal in FIG. 2 to FIG. 6, and therefore, repeated descriptions are properly omitted.

Optionally, in an embodiment, in step 801, in a case in which the remaining bandwidth in the target uplink frame is greater than or equal to a first threshold, the remaining bandwidth in the target uplink frame is determined as the test window. In this way, related detection can be completed using a remaining bandwidth in a same target uplink frame, which ensures reliability of a detection result. It should be understood that, a value of the first threshold is not limited in this embodiment of the present disclosure.

Optionally, as another embodiment, an allocated bandwidth in the target uplink frame may be used by an optical network device to transmit an uplink optical signal.

Optionally, in step 802, a code stream of an uplink electrical signal sent by an optical module and received by a data module is detected in the test window, where the uplink electrical signal is obtained by the optical module by performing optical-to-electrical conversion on an uplink optical signal, and/or, whether an optical module receives an uplink optical signal sent by an optical network device is detected in the test window, and/or, strength of an uplink optical signal that is received by an optical module from an optical network device is detected in the test window, and the like. An abnormality that occurs in an optical network can be identified in time by detecting an uplink optical signal such that a corresponding measure is taken to rectify a fault, thereby reducing a fault duration of an optical network system, and improving customer satisfaction.

Optionally, as another embodiment, when remaining bandwidths in N successive target uplink frames are all less than the first threshold, an empty window with a bandwidth greater than or equal to the first threshold is opened as the test window, where N is a positive integer. Optionally, the bandwidth of the empty window may be set to be greater than or equal to the first threshold.

That is, preferably, when a remaining bandwidth in an uplink frame is sufficient, detection can be started in the remaining bandwidth in the uplink frame, and when neither/none of remaining bandwidths in N successive uplink frames is greater than the preset first threshold, that is, neither/none of the N successive frames has a sufficient remaining bandwidth, an empty window can be started for detection.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, a storage array, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

What is claimed is:

1. An apparatus for detecting an uplink optical signal, comprising:
   a memory; and
   a processor coupled to the memory and configured to:
      determine a remaining bandwidth in a target uplink frame as a test window when the remaining bandwidth in the target uplink frame is greater or equal to a first threshold, wherein the remaining bandwidth in the target uplink frame indicates an unallocated bandwidth in the target uplink frame; and
      detect the uplink optical signal in the test window.

2. The apparatus according to claim 1, wherein the processor is further configured to trigger a dynamic bandwidth allocation (DBA) to open an empty window with a bandwidth greater than a first DBA threshold as the test window when the remaining bandwidths in N successive target uplink frames are all less than the first threshold, and wherein N is a positive integer.

3. The apparatus according to claim 1, wherein the processor is further configured to trigger a dynamic bandwidth allocation (DBA) to open an empty window with a bandwidth equal to a first DBA threshold as the test window when the remaining bandwidths in N successive target uplink frames are all less than the first threshold, and wherein N is a positive integer.

4. The apparatus according to claim 1, wherein the processor is further configured to:
   receive the uplink optical signal from an optical network device;
   perform optical-to-electrical conversion on the uplink optical signal to obtain an uplink electrical signal; and
   detect, in the test window, a code stream of the obtained uplink electrical signal.

5. The apparatus according to claim 1, wherein the processor is further configured to:
   receive the uplink optical signal from an optical network device; and
   detect, in the test window, whether the uplink optical signal is received.

6. The apparatus according to claim 1, wherein the processor is further configured to:
   receive the uplink optical signal from an optical network device; and
   detect, in the test window, strength of the received uplink optical signal.

7. The apparatus according to claim 1, wherein the processor is further configured to:
   receive the uplink optical signal from an optical network device;
   detect, in the test window, whether the uplink optical signal is received; and
   detect, in the test window, strength of the received uplink optical signal.

8. An optical line terminal, for detecting an uplink optical signal, comprising:
   a memory; and
   a processor coupled to the memory and configured to:
     determine a remaining bandwidth in a target uplink frame as a test window when the remaining bandwidth in the target uplink frame is greater or equal to a first threshold, wherein the remaining bandwidth in the target uplink frame indicates an unallocated bandwidth in the target uplink frame; and
     detect the uplink optical signal in the test window.

9. A system for detecting an uplink optical signal, comprising:
   an optical line terminal;
   a passive optical splitter coupled to the optical line terminal; and
   at least one optical network unit coupled to the passive optical splitter,
   wherein the optical line terminal comprises:
     a memory; and
     a processor coupled to the memory and configured to:
       determine a remaining bandwidth in a target uplink frame as a test window when the remaining bandwidth in the target uplink frame is greater or equal to a first threshold, wherein the remaining bandwidth in the target uplink frame indicates an unallocated bandwidth in the target uplink frame; and
       detect the uplink optical signal in the test window.

10. A method for detecting an uplink optical signal, comprising:
    determining a remaining bandwidth in a target uplink frame as a test window when the remaining bandwidth in the target uplink frame is greater or equal to a first threshold, wherein the remaining bandwidth in the target uplink frame indicates an unallocated bandwidth in the target uplink frame; and
    detecting the uplink optical signal in the determined test window.

11. The method according to claim 10, further comprising opening an empty window as the test window when remaining bandwidths in N successive target uplink frames are all less than the first threshold, wherein the empty window has with a bandwidth not less than a first dynamic bandwidth allocation (DBA) threshold, and wherein N is a positive integer.

12. The method according to claim 10, wherein detecting the uplink optical signal in the test window comprises detecting, in the test window, a code stream of an uplink electrical signal, and wherein the uplink electrical signal is obtained by performing optical-to-electrical conversion on the uplink optical signal.

13. The method according to claim 10, wherein detecting the uplink optical signal in the test window comprises:
    detecting, in the test window, whether the uplink optical signal from an optical network device is received; and
    detecting, in the test window, strength of the uplink optical signal that is received from the optical network device.

14. The method according to claim 10, wherein detecting the uplink optical signal in the test window comprises detecting, in the test window, whether the uplink optical signal from an optical network device is received.

15. The method according to claim 10, wherein detecting the uplink optical signal in the test window comprises detecting, in the test window, a strength of the uplink optical signal that is received from an optical network device.

* * * * *